United States Patent [19]
Petrick

[11] 4,254,970
[45] Mar. 10, 1981

[54] VEHICLE SUSPENSION USING PRESSURIZED BOURDON TUBES

[75] Inventor: Ernest N. Petrick, Ann Arbor, Mich.

[73] Assignee: The United States of America as represented by the Secretary of the Army, Washington, D.C.

[21] Appl. No.: 101,932

[22] Filed: Dec. 10, 1979

[51] Int. Cl.³ .............................................. B60G 11/32
[52] U.S. Cl. ..................................... 280/705; 280/660
[58] Field of Search ............... 280/705, 660, 662, 663, 280/666

[56] References Cited
U.S. PATENT DOCUMENTS

| 3,602,470 | 8/1971 | Reynolds | 280/705 |
| 4,113,279 | 9/1978 | Hausenblas | 280/705 |
| 4,156,536 | 5/1979 | Brandstadter | 280/705 |

Primary Examiner—Robert R. Song
Attorney, Agent, or Firm—Peter A. Taucher; John E. McRae; Nathan Edelberg

[57] ABSTRACT

A vehicle suspension especially for tracked vehicles, comprising an internally pressurized Bourdon tube operatively located between the sprung mass and each road wheel. A single liquid pump can be used to selectively pressurize different ones of the Bourdon tubes to different pressure values in accordance with expected loadings for particular ones of the road wheels. Depressurization of all Bourdon tubes can be used for vehicle height control, as for example to reduce the silhouette of a military vehicle and/or to reduce ground clearance.

9 Claims, 5 Drawing Figures

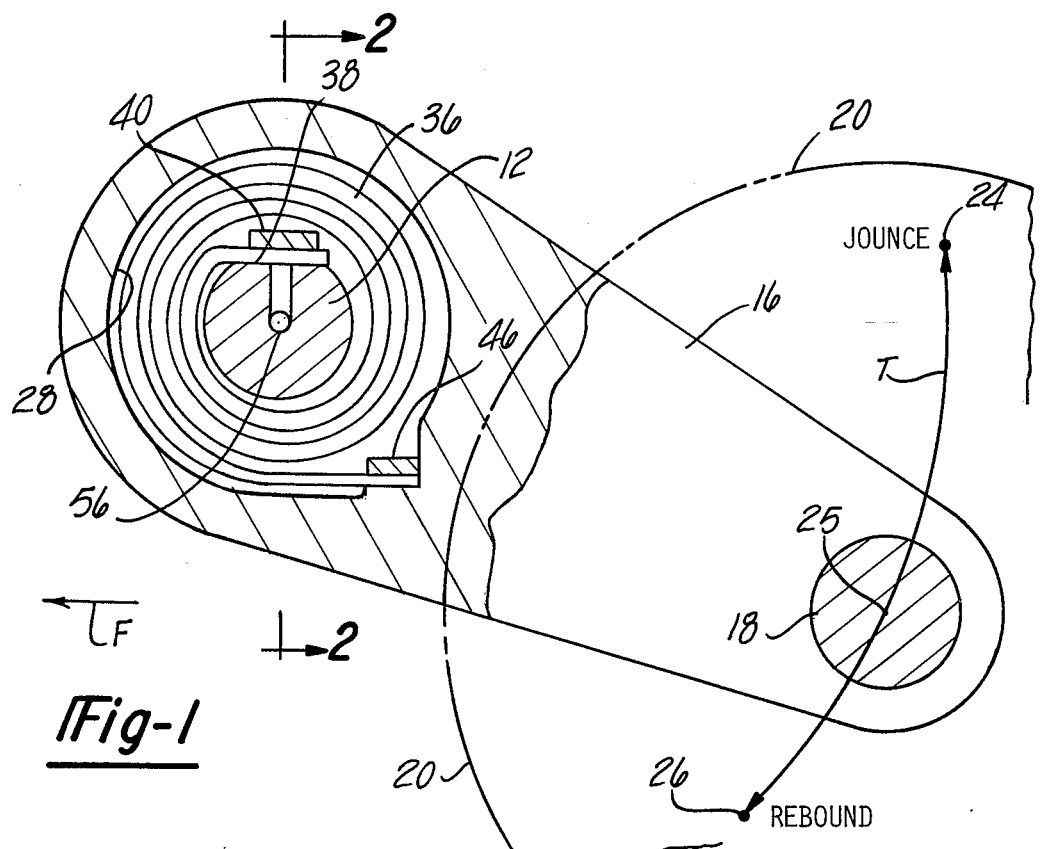
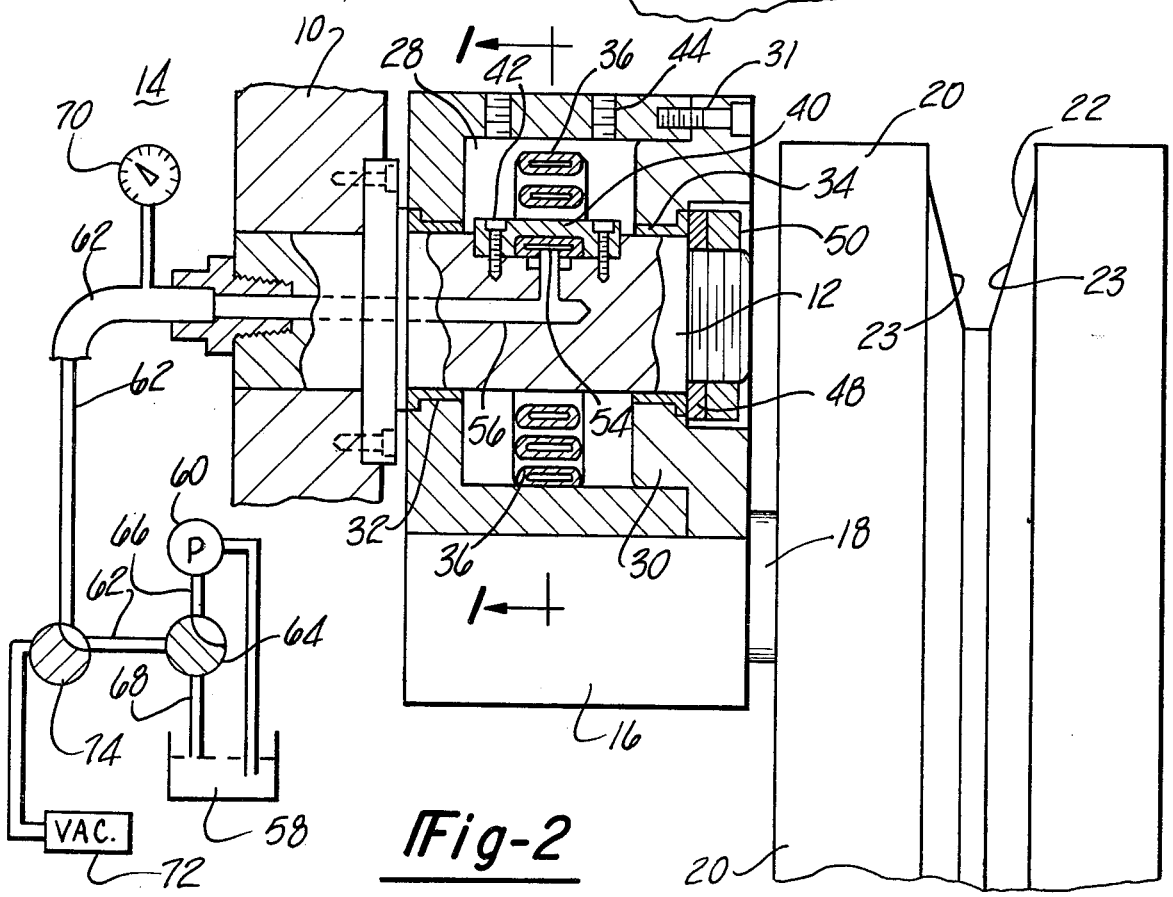

A – SILICONE F-4029
B – SILICONE 200
C – MINERAL OIL
D – WATER
E – GLYCERINE
F – MERCURY

VEHICLE SUSPENSION USING PRESSURIZED BOURDON TUBES

BACKGROUND AND SUMMARY OF THE INVENTION

This invention relates to vehicle suspensions; it is applicable to any wheeled vehicle, but especially to tracked vehicles used by the military. One object of the invention is to provide a suspension that is located outside the vehicle body so that the vehicle interior space is more effectively used for its intended purpose, e.g. equipment or personnel. Another object of the invention is to provide a suspension that occupies a relatively small space within a reasonably sized roadarm; the small space feature minimizes the undesired weight increase for incorporation of the suspension function in the unsprung mass (wheel-roadarm assembly). A further object of the invention is to provide a vehicle suspension wherein the suspension force can be controlled and changed at each road wheel from a remote location such as the driver's station. A further object is to provide a suspension wherein the suspension forces at the collective road wheels can be raised or lowered to vary the ground clearance and vehicle silhouette (heighth).

The general object of the invention is to provide vehicle suspension that is manufacturable at relatively low cost, and that is repairable in the field without excessive component tear-down effort.

The invention described herein may be manufactured, used, and licensed by or for the Government for governmental purposes without payment to me of any royalty thereon.

THE DRAWINGS

FIG. 1 fragmentarily illustrates a suspension for one road wheel of a vehicle incorporating this invention; FIG. 1 is taken on line 1—1 in FIG. 2.

FIG. 2 is a sectional view taken on line 2—2 in FIG. 1.

BRIEF DESCRIPTION OF ILLUSTRATED DEVICE

Figures 3, 4:
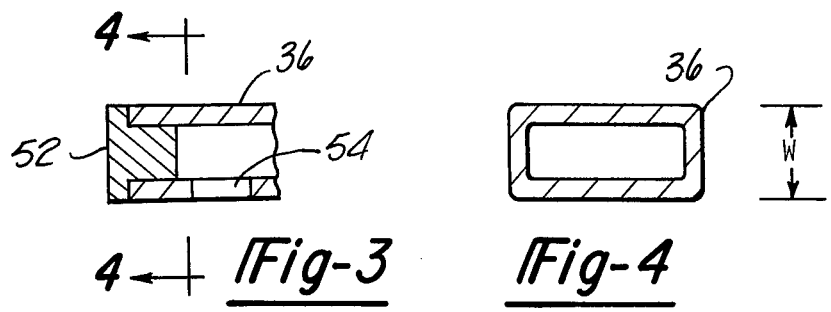
FIGS. 3 and 4 are sectional views taken through a Bourdon tube utilized in the FIG. 1 suspension.

FIGS. 1 and 2 illustrate a vehicle suspension that includes a roadarm 16 mounted for swinging movement around an axis defined by stub shaft 12. As best seen in FIG. 2, shaft 12 projects from the vehicle side wall 10; the road wheel 20 is rotatably mounted on an axle 18 extending from the free end of arm 16. As the vehicle moves forward in the direction designated by letter F (FIG. 1) terrain irregularities cause road wheel 20 to move in a generally vertical arc designated by letter T. The limit of upward wheel travel is designated by numeral 24; the limit of downward wheel travel is designated by numeral 26. The road wheel—roadarm assembly is shown in its normal at-rest condition.

Suspension effect is provided by a fluid-filled Bourdon tube 36 spiralled around stub shaft 12. One end of the tube is anchored to shaft 12; the other end of the tube is anchored to roadarm 17. The Bourdon tube is a stiff metal spring offering resistance to deflection in the wind-up direction. Therefore the sprung mass is cooperatively borne by the metal spring tube material and by the fluid fill therein. As the road wheel moves upwardly toward the jounce position 24 the spiral Bourdon tube undergoes a wind-up deflection so that its internal volume is decreased approximately in proportion to the amount of deflection. Therefore the fluid within the Bourdon tube is subjected to a compressive force. The fluid is pre-selected to have a compression capability related to the force required to return the road wheel from jounce position 24 to its normal position 25 (FIG. 1) with minimum dislocation of the sprung mass from a given attitude in space. During upward wheel travel the sprung mass imparts energy to the Bourdon tube wall and compressible liquid; at least some of this energy (less heat) is returned to the sprung mass during downward wheel travel.

THE ILLUSTRATED DEVICE IN GREATER DETAIL

Referring especially to FIGS. 1 and 2, there is fragmentarily shown therein one sidewall 10 of a military vehicle that mounts a stub shaft 12 on its outer surface. In FIG. 2 the space 14 to the left of wall 10 would be within the vehicle interior, whereas the space to the right of wall 10 would be outside the vehicle. Shaft 12 provides a mount for swingable roadarm 16 at its free end for rotational support of a conventional road wheel 20. Road wheel 20 is grooved at 22 to provide guide surfaces 23 cooperable with upstanding teeth on an endless ground-engagement track (not shown). During movement of the vehicle in the forward direction designated by arrow F in FIG. 1 the axle 18 can undergo oscillatory movement between the upper jounce position 24 and the lower rebound position 26; the axle is shown in its normal or static, at-rest position.

Roadarm 16 is provided with a generally cylindrical cavity 28 that is closed by means of a plug-like closure 30 suitably secured to the roadarm proper by a number of peripheral bolts 31. In the illustrated arrangement the necessary bearing connections between roadarm 16 and stub shaft 12 are provided by two axially spaced sleeve bearings 32 and 34 suitably pressfit into the roadarm and closure 30; other bearing arrangements or bearing types can be used, although it is preferred to utilize two relatively widely spaced bearings for best containment of the load.

The cavity space 28 between bearings 32 and 34 houses a spiral Bourdon tube 36 whose inner convolution is engaged with a flat 38 machined into shaft 12. The Bourdon convolution is anchored to the shaft by means of a U-shaped clamp bar 40 and a pair of hold-down screws 42. These screws are accessible through holes in the roadarm 16 normally closed by threaded plugs 44.

The end portion of the Bourdon tube outer convolution is anchored to roadarm 16 by means of a bar 46 that is generally similar to clamp bar 40. Bar 46 is accessible for servicing purposes after removing closure 30 from cavity 28. The roadarm 16 is normally prevented from axial dislodgment off shaft 12 by means of a thrust washer 48 and nut 50.

The extreme ends of the Bourdon tube may be sealed closed by a small plug 52, as shown for example in FIG. 3. Liquid is supplied to the interior of the Bourdon tube through a small opening 54 that communicates with a system of drilled holes 56 in stub shaft 12. As can be visualized from FIG. 2, liquid drawn from sump 58 by pump 60 will pressurize the supply passage 62 when the control valve 64 is operated to a position communicating the pump output 66 with said passage 62. Valve 64 is a three way valve adapted to either (1) close the end of passage 62, as shown, or (2) communicate pump output 66 with passage 62 (for pressurizing the Bourdon tube), or (3) communicate the end of passage 62 with a drain passage 68 (for depressurizing the Bourdon tube). A conventional pressure gage 70 connects with the passage system at a point between valve 64 and the Bourdon tube 36 for thereby monitoring and identifying the pressure value existing in the Bourdon tube at any given time. The Bourdon tube may be initially charged with pressurized fluid after first establishing a vacuum condition within the Bourdon tube interior. This condition can be obtained connecting passage 62 to a vacuum source 72, as through a valve 74. Thereafter the valve can be actuated to place passage 62 in communication with the previously mentioned valve 64. Operation of valve 64 enables the pump 60 to pressurize passage 62, holes 56 and the Bourdon tube 36 with fluid from sump 58.

Figure 5:
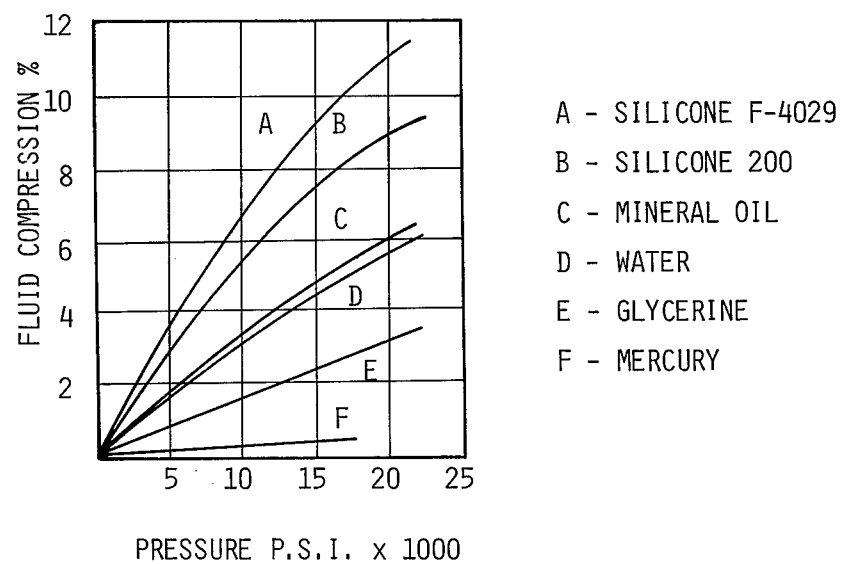
FIG. 5 is a chart illustrating the volume compression characteristics of certain liquid substances, two of which are suitable as filler materials for the Bourdon tube used in the FIG. 1 suspension.

Preferably the Bourdon tube 36 is charged with a liquid having a compressible character, for example a siloxane used already in liquid springs in aircraft landing gear and elsewhere. Attached FIG. 5 shows the compressibility characteristics of various known materials, two of which are useful as liquid spring substances in practice of the present invention. FIG. 5 is a reproduction of a chart appearing on page 206 of the book "Spring Design and Application", edited by Nicholas P. Chironis, Associate Editor of Product Engineering (published by McGraw Hill Book Co. Inc. in 1961). Materials A and B are silicone fluids available from the Dow Corning Corporation; they experience volume compressions on the order of 9–11% when subjected to pressures of 20,000 p.s.i. These two materials are believed suitable for use in my contemplated suspension environment; i.e. liquid filler materials for Bourdon tube 36.

The Bourdon tube is preferably charged with liquid so that the liquid provides negligible suspension effect when roadarm 16 is in the rebound position (26 in FIG. 1). In the rebound position the relatively stiff Bourdon coil 36 will preferably be in its free state or unstressed condition. As the sprung mass loads the roadarm 16 to its illustrated normal position (full lines in FIG. 1) the liquid within the Bourdon coil will undergo compression, to a value related to the sprung mass and percentage thereof to by supported by this particular road wheel. During movement over rough terrain the resultant upward displacement of the roadarm 16 toward the jounce position 24 will provide further compression of the Bourdon liquid incident to wind-up movement of the tube.

It is contemplated that a single pump 60 will be utilized to charge all Bourdon tubes in the vehicle; however different Bourdon tubes may be associated with different pressurizing valves 64 for attainment of different pressure conditions in different Bourdon tubes, dependent on different wheel load conditions. In a military tracked vehicle the front wheels and rear wheels usually are the most heavily loaded; the intermediate wheels are more lightly loaded. In one possible system the two front wheels could be charged with liquid through a first valve 64, the two rear wheels could be charged through a second valve 64, and the intermediate wheels could be charged through a third valve 64.

The valves would be individually opened and closed from the driver station; a pressure gage 70 associated with each valve 64 would signal the driver when to open and close the valve.

A further possible employment of the illustrated system is in attainment of vehicle heighth change or regulation for purposes of increasing ground clearance (to pass over obstacles) or to lower the vehicle silhouette (decreased chance of observation or destruction by enemy force). It is believed that it would be possible to vary the liquid pressure within the entire system of Bourdon tubes, to thereby raise or lower the vehicle elevation; the upper and lower limits on this would be the two positions designated by numerals 24 and 26 in FIG. 1.

The drawing shows a Bourdon tube 36 having slightly more than two complete convolutions. However it is believed that a lesser or greater number of covolutions could be employed, depending on the load to be carried by the road wheel. A limiting factor is the diameter of cavity 28 that is possible with present roadarm dimensions. With a reasonable Bourdon tube cross section (dimension W in FIG. 4) three convolutions is about the upper limit. One convolution is about the minimum that can be used while still obtaining a sufficient angular deflection of approximately fifty degrees, necessary for a wheel travel of twelve or more inches. Preferably the Bourdon coil has approximately a rectangular or oblong cross section as shown in FIG. 4 to provide desired combination of features such as sufficient liquid volume, sufficient effective area, and sufficient tube wall thickness. The Bourdon coil is wound so that its rectangular cross section has its major axis thereof normal to the wind-unwind plane of the spiral.

I wish it to be understood that I do not desire to be limited to the exact details of construction shown and described for obvious modifications will occur to a person skilled in the art.

I claim:

1. In a wheeled vehicle wherein each wheel is carried on a road arm swingably connected to the vehicle body: a novel suspension between the vehicle body and each roadarm, comprising a stub shaft projecting from said vehicle body for swingably mounting the roadarm; said roadarm including inboard and outboard bearings operatively engaged with the stub shaft at spaced points therealong, the roadarm space between said bearings defining an annular cavity surrounding the stub shaft; a spiral Bourdon tube operatively connected between the shaft and roadarm within the annular cavity; said Bourdon tube being a hollow tube spiralled for wind-up action as the roadarm moves toward the jounce position and unwind action as the roadarm moves toward the rebound position; and a compressible fluid filling the interior space within the tube.

2. The suspension of claim 1 wherein the compressible fluid is a liquid capable of approximately ten percent volume compression when subjected to a pressure of 20,000 p.s.i.

3. The suspension of claim 1 wherein the Bourdon tube has a rectangular cross section, the major axis thereof being normal to the wind-unwind plane.

4. The suspension of claim 1 wherein the Bourdon tube contains between one and three convolutions.

5. The suspension of claim 1 wherein the compressible fluid is a liquid; said suspension including liquid pumping means located within the vehicle for maintaining the pressure in each Bourdon tube within a predetermined range when the vehicle is in a static at-rest condition; each Bourdon tube being connected to said pumping means via a passage system that includes communicating holes in the stub shaft.

6. The suspension of claim 5 wherein each passage system comprises a three way valve means operable to selectively connect the holes in the stub shaft with either the pump means or a low pressure sump, whereby each roadarm can have a different Bourdon tube pressure in accordance with its location on the vehicle.

7. The suspension of claim 1 wherein the annular cavity in the roadarm is closed by a plug-like closure removably fitting into the cavity mouth; the outboard bearing being carried on said closure, whereby removal of the closure permits access to the Bourdon tube.

8. The suspension of claim 7 wherein the cavity has a cylindrical internal mouth surface, said closure including a cylindrical plug section tightly fitting within the cavity mouth surface, whereby the closure constitutes a load-bearing roadarm component.

9. The suspension of claim 1 wherein the compressible fluid is a liquid; said liquid being supplied to each Bourdon tube from a single pump common to all tubes; the liquid supply system comprising a number of control valves, each servicing selected ones of the Bourdon tubes; each control valve being operable to (1) selectively pressurize the associated Bourdon tubes, (2) depressurize the Bourdon tubes, or (3) maintain a designated pressure within said tubes; and a pressure gage connected to the liquid space between each control valve and its associated Bourdon tubes.

* * * * *